Patented Oct. 18, 1949

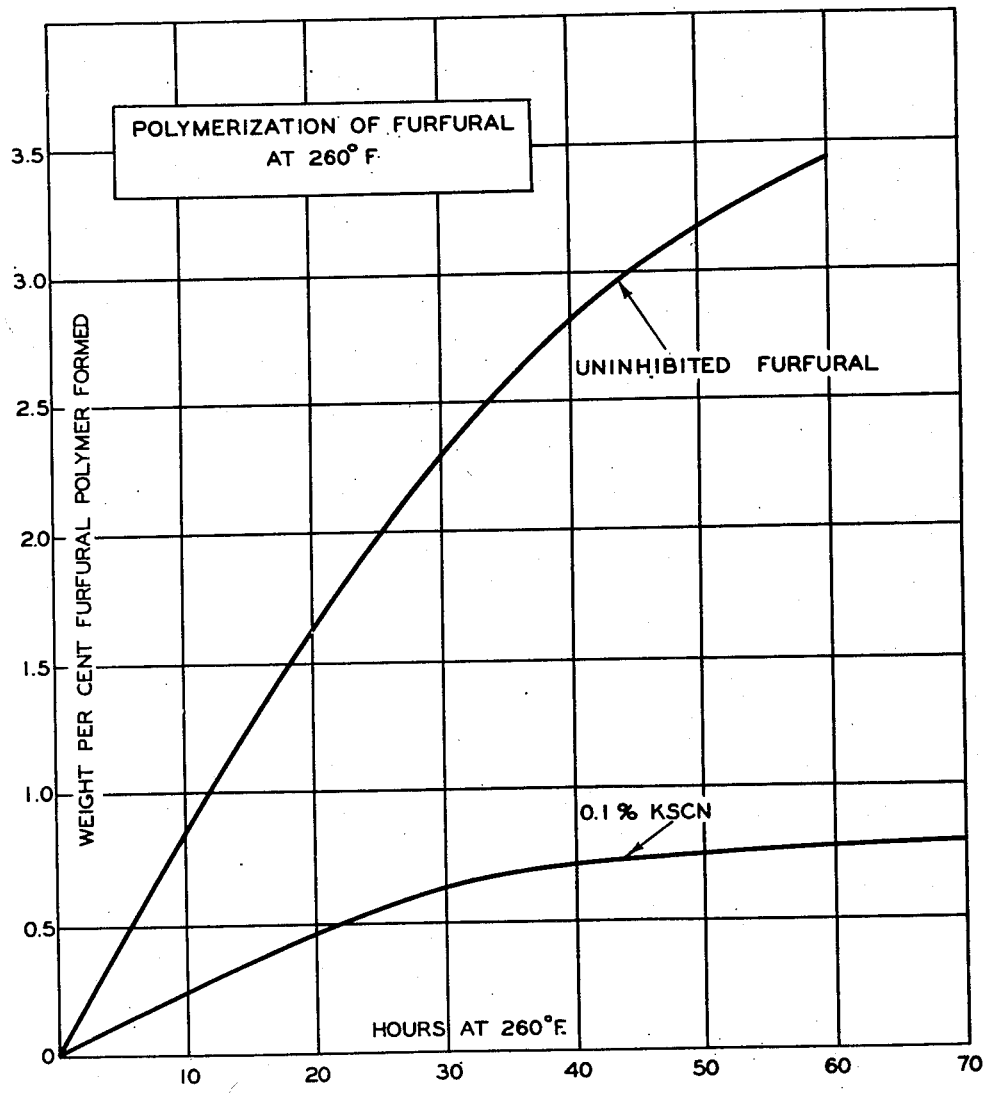

2,485,071

UNITED STATES PATENT OFFICE 2,485,071

INHIBITING POLYMERIZATION OF FURFURAL IN EXTRACTIVE DISTILLATION

Walter A. Schulze and John C. Hillyer, Bartlesville, Okla., assignors to Phillips Petroleum Company, a corporation of Delaware Application March 26, 1945, Serial No. 584,982

16 Claims. (Cl. 202—39.5)

This invention relates to a method for inhibiting polymerization of furfural. More specifically, this invention relates to the addition of selected inorganic compounds to furfural to inhibit the formation of polymeric materials when said furfural is subjected to elevated temperatures. Still more specifically this invention is concerned with the use of inorganic thiocyanates as agents for preventing or greatly retarding the formation of high-boiling resins, tars, aldehyde condensation products and other non-volatile substances in furfural solvents as applied to various commercial processes. The present invention is particularly concerned with the problem of furfural polymerization inhibition in those processes wherein the furfural is maintained at elevated temperatures over extended periods of time or under conditions conducive to the formation of resinous materials.

Furfural is employed in large quantities in numerous commercial processes. Its use as a selective solvent for the segregation of compounds or groups of compounds, whose volatilities lie so close together that other methods of separation are impractical or inadequate, is well known. In the refining of lubricating oils, for example, undesirable olefinic and diolefinic hydrocarbon constituents may be separated from the paraffinic and naphthenic hydrocarbons through the use of furfural. Similarly, in the refining of natural drying oils employed in paints, various dissimilar fractions which have characteristics superior to the original mixture may be obtained. Furfural is also used as a selective solvent in the refining of resins, especially rosin and rosin derivatives. Furfural has also come into extensive use in extractive distillation processes wherein the volatilities of close-boiling compounds are altered sufficiently to enable separations to be effected satisfactorily in commercial fractionators or super-fractionators. Thus, from C₄ hydrocarbon fractions produced in refinery operations such as catalytic or thermal cracking, there may be obtained streams of substantially pure n-butenes, butadiene, and olefin-free normal and isobutane streams. The dehydrogenation of n-butane yields n-butenes which may be separated from the butane by furfural extractive distillation to yield a recycle stream substantially free from unsaturates. Similarly, products resulting from the dehydrogenation of n-butenes may be segregated to give essentially complete recovery of 1,3-butadiene in the state of purity required for the manufacture of synthetic rubber and yield a stream of substantially diolefin-free butenes for recycling to the catalyst. Other applications of the selective action of furfural are numerous. Our invention is applicable to furfural used in these or any other applications where furfural polymerization is encountered.

In the various commercial processes utilizing the selective solvent action of furfural, elevated temperatures are maintained over an extended period as the solvent circulates throughout the system. While furfural is known to darken fairly rapidly when stored at atmospheric temperatures, with the resultant formation of tarry or resinous polymerization products, the formation of said polymeric materials is greatly accelerated as the temperature is increased. In commercial systems the temperature is often maintained at about 200 to 300° F. or higher thereby promoting the formation of tarry products which accumulate in vital parts of the equipment such as valves, pumps, heat exchanger tubes and the like and seriously interfere with flow and operation of the process. In extreme cases polymer formation may occur to such an extent as to block the line. In addition to operational difficulties the selectivity of the solvent is markedly decreased and may render the desired separation unsatisfactory or even impossible.

In order to avoid the operating difficulties inherent in furfural-extraction systems and to maintain the solvent selectivity at a high level, it has heretofore been necessary to provide facilities for the removal of polymeric materials. Polymer removal has been accomplished by installing means for periodic distillation of the solvent or a continuous distillation system has been provided whereby a sufficient portion of the circulating stream is distilled at such a rate as to keep the polymer content below a certain level. Methods now in use for purifying furfural used in the recovery of normal butene and butadiene from C₄ hydrocarbon streams by extractive distillation are described in detail in the copending application of Hachmuth, Ser. No. 460,874, now U. S. Patent 2,372,668 and in U. S. Pats. to Buell et al., 2,350,584, and Hachmuth, 2,350,609, to which attention is directed. The methods hitherto proposed accomplish satisfactory elimination of the polymer, but at the same time there is entailed an appreciable loss in the volume of solvent. The cost of replacing the solvent often becomes a major factor in the total operating cost and may be sufficient to render the process commercially unattractive. While certain operating difficulties may account for losses in the furfural, it has been found that the formation of heavy polymer is responsible for the major portion of the loss. Complete or partial elimination of polymer formation is highly desirable and the accomplishment of this objective would constitute a valuable advance in the art of furfural extraction processes.

Our invention is particularly applicable to furfural used as the solvent in the extractive distillation of aliphatic hydrocarbon streams to recover unsaturated hydrocarbons therefrom such as olefins and/or diolefins, for example, normal butene and/or butadiene from $C_4$ hydrocarbon streams, this being the principal if not the only present commercial application of extractive distillation with furfural as a means of recovering unsaturated hydrocarbons. However, our invention may be applied wherever furfural is used as the solvent in the recovery by extractive distillation of other aliphatic olefins or aliphatic conjugated diolefins from hydrocarbon streams containing the same.

In extractive distillation, solvent extraction is combined with continuous fractional distillation, the furfural being supplied continuously to the top of the column and descending therein and the hydrocarbon feed being supplied to an intermediate point in the column and being vaporized upwardly countercurrently to the furfural, there being provided the usual bubble trays or packing, a reboiler at the bottom of the column and means for condensing overhead vapors and returning condensate as reflux to the top of the column. The separation of butadiene in this manner is described in copending application of Hachmuth, Ser. No. 454,312, filed August 10, 1942, now U. S. Patent 2,415,006, and Ser. No. 438,844, filed April 13, 1942, now U. S. Patent 2,434,796. The latter application also discloses the separation of normal butene from normal butane and is directed to the use of a solvent consisting of furfural containing dissolved water in amount ranging from 1% up to saturation which substantially lowers the boiling temperature of the furfural. The temperature at the bottom of the extractive distillation column is the boiling point of the liquid at that point under the operating pressure of the column. The operating pressure is sufficiently high to permit condensation of a portion of the overhead vapors for reflux. The liquid in the bottom of the absorption column is composed of furfural having dissolved therein water and the selectively absorbed hydrocarbon. This bottoms liquid is withdrawn and introduced into another column at a point near the top. In this second column the dissolved unsaturated hydrocarbons are stripped out of the top and the lean furfural bottom liquid is cooled and returned to the absorption column. The stripper column is provided with a reboiler at its bottom and means for refluxing with condensed overhead. The temperature at the bottom of the stripping column is the boiling point of the liquid at that point under the column operating pressure. Ordinarily the furfural absorber and stripper are operated with bottom temperatures of 300–325° F. and under pressures of 50–65 pounds per square inch gauge. In the furfural re-run unit which operates continuously on a sidestream of the lean furfural, temperatures of 200–300° F. and pressures ranging from atmospheric to 40 pounds per square inch gauge are commonly maintained. Thus, it will be seen that the furfural is continuously being subjected to repeated vaporization at relatively high temperatures. The combined influence of heat, pressure, iron and iron salts, acids, moisture and hydrocarbons, especially olefins or diolefins, and other factors as yet but little understood brings about the polymerization of the furfural. Due to the scarcity and high cost of furfural the loss in this manner has been a most serious problem. This problem is made more serious because the best available information to date indicates that the polymerization of furfural is auto-catalytic.

It is an object of the present invention to provide a method of inhibiting the formation of high-boiling resins, tars and other non-volatile materials in furfural.

It is also an object of the invention to provide a means for reducing the accumulation of heavy tar deposits in furfural extractive distillation systems operated at elevated temperatures.

It is a further object to maintain the furfural in a high state of selectivity in extractive distillation systems while simultaneously preventing or reducing polymer formation in said systems.

It is a still further object to reduce the formation of polymeric materials in furfural through the addition of inhibitors comprising thiocyanates of alkali metals.

The accompanying drawing portrays graphically the effect of alkali metal thiocyanates in reducing polymerization of furfural in accordance with the present invention, as determined by actual laboratory tests.

Heretofore no practical process for reducing or retarding the rate of polymer formation in furfural has been advanced. The addition of small quantities of antioxidants, particularly pyrogallol, has been proposed but this expedient has not been found to give satisfactory results in commercial operations. While it is known that oxygen promotes resin formation in furfural, oxygen-containing gases are excluded from substantially all commercial units. Antioxidants, therefore, exert no protective function against resin formation which proceeds rapidly at elevated temperatures in systems from which oxygen is excluded. In fact, conventional antioxidants such as phenol and amino compounds are known to react with furfural at elevated temperatures, to form non-volatile products, thus accounting for appreciable solvent loss as well as accumulation of large quantities of solid materials.

We have found that polymer formation in furfural can be greatly retarded by the addition of small percentages of thiocyanates, particularly thiocyanates of the alkali metals, to the solvent. The preferred thiocyanates of the present invention are those of sodium and potassium although other alkali metal thiocyanates may be used.

The term "alkali metal thiocyanate" as used herein is intended to include ammonium thiocyanate. Ammonium thiocyanate is generally satisfactory but in some instances there may be present in the furfural some alkaline compound which may result in the liberation of a small amount of ammonium hydroxide which is objectionable and therefore some slight risk is involved in using ammonium thiocyanate in all cases.

The inhibitor may be added to the system by any convenient means. The selected thiocyanate may be introduced directly in the powdered form or a concentrated water solution of the salt may be prepared and added to the furfural stream. Since water is present in controlled amounts in most commercial units of this type, the latter method is generally preferred.

The quantity of inhibitor required depends upon the rate of polymerization of the solvent in the system under consideration. Among the factors affecting the rate of polymerization may be mentioned the temperature, the time during which a given sample of furfural is subjected to elevated temperatures, the presence of certain heavy metals such as iron, copper, tin and lead and their salts, and the presence of other substances such as water, oxygen, tars, gums and the like. The polymer itself has been shown to exert an accelerating effect on the rate of polymerization. Free mineral acids, particularly hydrochloric acid, even when present in minute quantities, also have a pronounced accelerating effect on the polymerization rate. Among the metal salts which may be present in the furfural stream, iron salts and, in particular, ferric chloride, are especially active in promoting the formation of resinous materials. Since variations in these factors will be found in different systems employing furfural, it is obvious that the individual cases must be studied in order to determine the amount of inhibitor necessary to effect the desired results. The optimum quantity of inhibitor is best determined experimentally by making tests on small samples withdrawn from the system. In general, the amount of inhibitor may vary from about 0.05 to 0.20 per cent by weight of the furfural although in some instances as little as 0.01 per cent or less may be effective. On the other hand, quantities as high as 0.50 per cent may be required in exceptional cases.

The concentration of inhibitor maintained throughout the stream is an important factor in the satisfactory operation of the present invention. In any given system the amount of inhibitor is controlled by either continuous or intermittent addition of fresh thiocyanate. Gradual loss in inhibitor results from reaction with various materials in the system and from mechanical loss, particularly that occurring from elimination with the small amount of polymer which is removed by continuous redistillation of the solvent or other suitable means. The amount of inhibitor present must not be allowed to exceed one per cent of the weight of the furfural. When this level is reached polymer formation is accelerated. At elevated temperatures it is possible that the inhibitor reacts with the furfural although no evidence of such activity is observed when the concentration of the thiocyanate is maintained within the preferred limits of our invention.

According to the process of our invention the addition of alkali metal thiocyanates will generally effect a reduction in the polymerization rate of furfural from 25 to as high as 80 or 90 per cent and in some cases substantially complete reduction is accomplished. The small quantities of polymer which gradually accumulate are then removed by any suitable means such as continuous redistillation. Through the use of our inhibitors, the replacement costs of the solvent are kept at a minimum and the operating expense attendant in the redistillation process becomes of minor importance. In addition to the removal of heavy polymer, the redistillation process also serves as a means of preventing the accumulation of spent inhibitor which is removed with the heavy polymer bottoms. Meanwhile the addition of fresh thiocyanate to the stream provides a means of maintaining the concentration of active inhibitor at the desired level.

The accompanying drawing portrays the results of a laboratory study of the action of potassium thiocyanate in inhibiting polymerization of furfural which has been accelerated with iron in the form of ferric chloride and hydrogen chloride. To a lot of pure steam distilled furfural there was added 0.01 per cent of concentrated hydrochloric acid (giving a concentration of 0.0036 per cent of hydrogen chloride) and 0.03 per cent of ferric chloride in order to accelerate polymerization of the furfural. To one set of samples of the accelerated furfural was added 0.10 per cent by weight of potassium thiocyanate as polymerization inhibitor. Another set of uninhibited samples of the accelerated furfural was prepared for purposes of comparison. The two sets of samples were placed in sealed tubes and subjected to heating at 260° F. under identical conditions for varying periods of time, the quantity of polymer formed being determined and plotted as shown. Direct comparison between the rate of polymerization for the inhibited and the uninhibited furfural was thus made possible. The graph shows the marked reduction in polymerization rate brought about by the use of potassium thiocyanate. Sodium thiocyanate is just as effective as, and possibly slightly more than, an equal weight of the potassium salt. The action of an alkali metal thiocyanate on pure or unaccelerated furfural is striking but is not so great as on the accelerated furfural or on the plant furfural such as is circulated in an extractive distillation system for the recovery of normal butene and/or butadiene from $C_4$ hydrocarbon mixtures. The addition of accelerators, ferric chloride and hydrogen chloride, represents an attempt to simulate plant conditions in the laboratory. Uninhibited pure furfural does not polymerize nearly so rapidly as uninhibited plant furfural such as that from an extractive distillation system. It is known that the plant furfural contains iron salts and substantial acidity and it has been found possible in the laboratory to approximate the effect of these by the addition of ferric chloride and hydrochloric acid to pure steam distilled furfural.

The following examples are included to further illustrate the present invention; however, it is not intended that they be interpreted as limitations of the scope of the invention.

*Example I*

In order to determine the effect of potassium thiocyanate as an inhibitor of furfural polymerization, 0.05 part of the salt and 5 parts of water were added to 100 parts of a furfural sample obtained from the circulating stream in a commercial unit employing this solvent for the separation of butanes, butenes and butadiene. Aliquot portions of this mixture were placed in a series of glass tubes, the air was replaced by nitrogen and the tubes sealed. The temperature was maintained at 260° F. throughout the test. Tubes were cooled and opened at frequent intervals and the non-volatile polymer content determined by a rapid vacuum disillation method carried out under carefully controlled conditions. The method comprises the rapid distillation of substantially all the furfural, the removal of traces of volatile matter by suitable means and weighing of the residue. The rate of formation of non-volatile polymer was established by comparison of each sample with a similar analysis made on the KSCN-water-furfural mixture immediately after it was prepared. Tests carried out over a 48-hour period showed that the rate of polymer formation averaged 0.10 weight per cent of the furfural per day. A series of tests run simultaneously using furfural from the same source but without the addition of the inhibitor showed a polymerization rate of 0.21 weight per cent of the monomer per day. The reduction in polymerization realized by the use of the inhibitor was 52 per cent.

Example II

Furfural obtained as in Example I, and water were mixed in the weight ratio of 5.0 parts water to 100 parts furfural and 0.1 part sodium thiocyanate was added. The procedure of Example I was followed except for the temperature which was held at 290° F. Tubes were opened at intervals during the 48-hour test and the polymer determined by the rapid vacuum distillation technique. Polymer was formed at the average daily rate of 0.13 weight per cent of the furfural. A parallel test in which no inhibitor was employed showed 0.30 weight per cent polymer per day based on the furfural charged. A 57 per cent reduction in the polymerization rate was, therefore, effected by the use of sodium thiocyanate as an inhibitor.

Example III

To 100 parts by weight of a freshly distilled sample of furfural containing 0.03 per cent by weight of ferric chloride were added 0.1 part of potassium thiocyanate and 5.0 parts water. Aliquot portions of the mixture were placed in sealed glass tubes as in Example I and polymerization allowed to proceed at a temperature of 260° F. Periodic examination of the tubes revealed a polymerization rate of 0.19 weight per cent of the monomer per day as against 0.95 per cent in a similar determination made on the same sample without the addition of the potassium thiocyanate. The decrease in polymerization rate accomplished by the use of an inhibitor amounted to 80 per cent.

Example IV

The action of potassium thiocyanate on a sample of freshly distilled furfural containing both hydrogen chloride and ferric chloride was studied. To 100 parts of the furfural containing 0.0036 per cent by weight of hydrogen chloride and 0.03 per cent ferric chloride were added 0.10 part potassium thiocyanate and 5.0 parts water. The procedure of Example I was followed while the temperature was held at 260° F. Tests carried out over a period of 60 hours revealed an average polymerization rate of 0.28 weight per cent of the furfural per day as contrasted with 1.38 per cent in a parallel series of tests in which no inhibitor was used. Thus a reduction of 80 per cent in the polymerization rate was accomplished.

Example V

To a sample of 100 parts by weight of furfural obtained from a commercial extractive distillation unit as in Example I were added 5.0 parts of water and 0.1 part sodium thiocyanate. The mixture was placed in a steel cylinder, the air was displaced by nitrogen and the cylinder placed in a bath at 260° F. in order to maintain the temperature at a constant level. Pressure in the cylinder was held at 50 pounds gage with nitrogen. Portions of the mixture were withdrawn at intervals and the polymeric products determined in the usual manner. The rate of formation of non-volatile material, over a 72-hour period, averaged 1.02 weight per cent of the furfural per day as against 1.21 per cent when no inhibitor was used, or a reduction of 16 per cent.

Example VI

In the manufacture of butadiene by two-stage catalytic dehydrogenation of normal butane, a recovery system embodying a normal butene absorber between stages and a 2-butene-butadiene absorber after the second stage was employed. A furfural-water mixture containing 6 weight per cent of water was fed continuously into the absorbers at a total rate of 260,000 gallons per hour. After removal of the hydrocarbon in the strippers associated with the respective absorbers, the lean furfural-water mixture was cooled to 120–130° F. and the major part of the cooled lean solvent was passed to the furfural storage tank for recycle to the absorbers. A side stream of lean furfural in suitable quantity was withdrawn and fed to a furfural rerun unit of the type shown in Buell et al., U. S. 2,350,584. The total volume of furfural in the entire system was 225,000 gallons. Under these conditions, operations were unsatisfactory because severe corrosion occurred and a considerable quantity of furfural was lost as polymer.

At this time the addition of sodium thiocyanate to the circulating furfural-water was begun. It was added at the rate of 20 pounds per hour until a concentration in the furfural of 0.10 weight per cent sodium thiocyanate was reached. The rate of sodium thiocyanate addition was then reduced to a quantity sufficient to maintain the 0.10 weight per cent concentration in the solvent. This caused marked reduction in the acidity and polymer content of the furfural and consequently required a considerably smaller quantity to be rerun in order to maintain a predetermined polymer concentration in the circulating solvent stream. The formation of polymer was reduced approximately 45 per cent by the use of sodium thiocyanate in accordance with this example.

From the foregoing it is seen that the present invention provides a simple, economical and effective method of suppressing polymerization of furfural which has been a most serious problem up till now. The invention can readily be applied to existing installations without drastic change or complication. The inorganic thiocyanates, especially those of the alkali metals, are cheap and readily available. The inhibitor is easily introduced to the system and readily maintained at a constant concentration. A small amount of the inhibitor suffices to greatly or completely suppress polymerization. Many other advantages of the present invention will be apparent to those skilled in the art.

We claim:

1. A process which comprises subjecting a mixture of organic compounds, capable of being segregated into dissimilar fractions by furfural, to selective solvent extraction with furfural containing not more than 1 per cent by weight of a furfural polymerization inhibiting compound selected from the group consisting of alkali metal thiocyanates, at temperatures elevated above atmospheric, and under non-oxidizing conditions.

2. A process which comprises subjecting a mixture of organic compounds, capable of being segregated into dissimilar fractions by furfural, to selective solvent extraction with furfural containing from 0.01 to 0.5 per cent by weight of an alkali metal thiocyanate, as a furfural polymerization inhibitor, at temperatures elevated above atmospheric, and under non-oxidizing conditions.

3. A process which comprises subjecting a mixture of organic compounds, capable of being segregated into dissimilar fractions by furfural, to selective solvent extraction with furfural containing not more than 1 per cent by weight of an alkali metal thiocyanate as a furfural polymerization inhibitor, at temperatures elevated above atmospheric, and under non-oxidizing conditions.

4. The process of claim 1 wherein said alkali metal thiocyanate is sodium thiocyanate.

5. The process of claim 1 wherein said alkali metal thiocyanate is potassium thiocyanate.

6. The process of claim 1 wherein said selective solvent extraction is effected in the presence of furfural polymerization accelerating materials.

7. A process which comprises subjecting a mixture of organic compounds, capable of being segregated into dissimilar fractions by furfural, to selective solvent extraction with furfural containing not more than 1 per cent by weight of an alkali metal thiocyanate as a furfural polymerization inhibiting compound, at an elevated temperature of at least 200° F., and under non-oxidizing conditions.

8. A process which comprises subjecting a hydrocarbon mixture containing unsaturated hydrocarbons selectively soluble in furfural to extractive distillation at an elevated temperature of at least 200° F. and under non-oxidizing conditions with furfural containing not more than 1 per cent by weight of an alkali metal thiocyanate as a furfural polymerization inhibiting compound.

9. A process which comprises subjecting an aliphatic C4 hydrocarbon mixture containing at least one unsaturated hydrocarbon selected from the group consisting of normal butene and butadiene to extractive distillation at an elevated temperature within the limits of 200–325° F. and under non-oxidizing conditions with furfural containing dissolved water in amount ranging from one per cent up to saturation and also containing not more than 1 per cent by weight of an alkali metal thiocyanate, thereby separating the less-saturated from the more-saturated C4 hydrocarbons while minimizing polymerization of furfural occurring during the said extractive distillation.

10. A process which comprises subjecting a mixture of organic compounds capable of being segregated into dissimilar fractions by furfural, to selective solvent extraction with furfural containing from 0.01 to 0.5 per cent by weight of an alkali metal thiocyanate as a furfural polymerization inhibiting compound at a temperature in the range of 200 to 325° F., and under non-oxidizing conditions.

11. A process which comprises subjecting a mixture of organic compounds capable of being segregated into dissimilar fractions by furfural, to selective solvent extraction with furfural containing from 0.01 to 0.5 per cent by weight of an alkali metal thiocyanate as a furfural polymerization inhibiting compound at an elevated temperature of at least 200° F., and under non-oxidizing conditions.

12. A process which comprises subjecting a hydrocarbon mixture containing unsaturated hydrocarbons selectively soluble in furfural to extractive distillation at a temperature in the range of 200 to 325° F. under non-oxidizing conditions with furfural containing from 0.01 to 0.5 per cent by weight of an alkali metal thiocyanate as a furfural polymerization inhibiting compound.

13. A process which comprises subjecting an aliphatic C4 hydrocarbon mixture containing at least one unsaturated hydrocarbon selected from the group consisting of normal butene and butadiene to extractive distillation at a temperature within the limits of 200 to 325° F. under non-oxidizing conditions with furfural containing dissolved water in amount ranging from one per cent up to saturation and also containing from 0.01 to 0.5 per cent by weight of an alkali metal thiocyanate, thereby separating the less-saturated from the more-saturated C4 hydrocarbons while minimizing polymerization of furfural during the said extractive distillation.

14. The process of claim 7 wherein said alkali metal thiocyanate is sodium thiocyanate.

15. The process of claim 7 wherein said alkali metal thiocyanate is potassium thiocyanate.

16. The process of claim 7 wherein said selective solvent extraction is effected in the presence of furfural polymerization accelerating materials.

WALTER A. SCHULZE.
JOHN C. HILLYER.

REFERENCES CITED

The following references are of record in the file of this patent:

UNITED STATES PATENTS

| Number | Name | Date |
|---|---|---|
| 2,241,175 | Barnes | May 6, 1941 |
| 2,267,309 | Senkus | Dec. 23, 1941 |
| 2,382,207 | Comstock et al. | Aug. 14, 1945 |
| 2,384,238 | Comstock et al. | Sept. 4, 1945 |
| 2,388,041 | Craig | Oct. 30, 1945 |
| 2,404,253 | Scarth | July 16, 1946 |
| 2,407,861 | Wolk | Sept. 17, 1946 |
| 2,409,781 | Mertz | Oct. 22, 1946 |

OTHER REFERENCES

Autoxidation and Antioxygenic Action, by C. Moureu et al. in Acadamie de Science Paris Compt. rend, volume 179, pages 237 to 242; volume 178, pages 824 to 827; volume 183, page 408.